(12) United States Patent
Ghiya et al.

(10) Patent No.: US 7,127,710 B2
(45) Date of Patent: Oct. 24, 2006

(54) IDENTIFYING PURE POINTERS TO DISAMBIGUATE MEMORY REFERENCES

(75) Inventors: Rakesh Ghiya, Santa Clara, CA (US); Daniel Lavery, Santa Clara, CA (US); David Sehr, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 748 days.

(21) Appl. No.: 10/178,608

(22) Filed: Jun. 24, 2002

(65) Prior Publication Data

US 2003/0237077 A1 Dec. 25, 2003

(51) Int. Cl.
*G06F 9/45* (2006.01)
*G06F 9/26* (2006.01)

(52) U.S. Cl. ............ 717/151; 717/140; 717/152; 717/160; 711/220

(58) Field of Classification Search ........ 717/136–161; 707/103 R, 206, 3; 714/53; 711/200, 220
See application file for complete search history.

(56) References Cited

U.S. PATENT DOCUMENTS

| | | | | | |
|---|---|---|---|---|---|
| 4,450,522 | A | * | 5/1984 | Pilat et al. .................. 711/220 |
| 4,807,111 | A | * | 2/1989 | Cohen et al. ................. 710/54 |
| 4,989,134 | A | * | 1/1991 | Shaw .......................... 707/206 |
| 5,420,993 | A | * | 5/1995 | Smith et al. ................ 711/206 |
| 5,509,131 | A | * | 4/1996 | Smith et al. ................ 711/206 |
| 5,555,412 | A | * | 9/1996 | Besaw et al. ............... 717/144 |
| 5,644,709 | A | * | 7/1997 | Austin ......................... 714/53 |
| 5,701,470 | A | * | 12/1997 | Joy et al. ................. 707/103 R |
| 5,790,866 | A | * | 8/1998 | Robison ..................... 717/160 |
| 5,799,185 | A | * | 8/1998 | Watanabe .................. 707/206 |
| 5,805,887 | A | * | 9/1998 | Wang ......................... 717/100 |
| 5,822,592 | A | * | 10/1998 | Zhu ........................... 717/120 |
| 5,909,579 | A | * | 6/1999 | Agesen et al. ............ 717/131 |
| 6,031,994 | A | * | 2/2000 | Radigan ..................... 717/152 |
| 6,059,839 | A | * | 5/2000 | Dehnert et al. ............ 717/154 |
| 6,094,664 | A | * | 7/2000 | Ungar ........................ 707/206 |
| 6,173,444 | B1 | * | 1/2001 | Archambault .............. 717/159 |
| 6,202,202 | B1 | | 3/2001 | Steensgaard ................. 717/8 |
| 6,272,676 | B1 | | 8/2001 | Haghighat et al. ........... 717/7 |
| 6,292,795 | B1 | * | 9/2001 | Peters et al. ................. 707/3 |
| 6,351,849 | B1 | | 2/2002 | Chen .......................... 717/9 |
| 6,560,613 | B1 | * | 5/2003 | Gylfason et al. .......... 707/200 |
| 6,578,090 | B1 | * | 6/2003 | Motoyama et al. ........ 719/315 |
| 6,718,542 | B1 | * | 4/2004 | Kosche et al. ............. 717/151 |
| 2002/0010911 | A1 | | 1/2002 | Cheng et al. ................ 717/4 |

OTHER PUBLICATIONS

Bogong et al., A study of pointer aliasing for software pipelining using run-time disambiguation, IEEE Nov. 30-Dec. 2, 1994 pp. 112-117.*
Weinshall et al., Disambiguation techniques for recognition in large databases and for under-constrained reconstruction, IEEE, Nov. 21-23, 1995 pp. 425-430.*
Bernstein et al., Dynamic memory disambiguation for array references, Nov. 30-Dec. 2, 1994 pp. 105-111.*
Huang et al., Speculative disambiguation: a compilation technique for dynamic memory disambiguation, IEEE, Apr. 18-21, 1994 pp. 200-210.*
Johnansen, Weak Measurements with Arbitrary Pointer States, IEEE, May 27, 2006, pp. 1-4.*

* cited by examiner

*Primary Examiner*—Wei Zhen
*Assistant Examiner*—Satish R. Rampuria
(74) *Attorney, Agent, or Firm*—Trop, Pruner & Hu, P.C.

(57) ABSTRACT

In one embodiment, disambiguation of memory references, such as structure field accesses, of a computer program is performed. Disambiguation may be effected by identifying pure pointer variables within the computer program and applying at least one disambiguation rule to memory references associated with the pure pointers to determine whether the references are disjoint.

14 Claims, 5 Drawing Sheets

IDENTIFYING PURE POINTERS TO DISAMBIGUATE MEMORY REFERENCES

BACKGROUND

Software compilers compile source code in a source language into target code in a target language. The target code may be executed directly by a data processing system or linked by a suitable linker with other target code for execution by the data processing system.

Typical data processing systems include a microprocessor in which execution of software instructions and manipulation of data occurs. In many programming environments, integer and transaction-processing workloads form a significant portion of microprocessor use. The workloads are derived from application programs, which are typically written in high-level languages such as C and C++. Programs written in these languages often make pervasive use of pointers, which are variables used in a software program that contain a reference to an address of a memory region in which data or a function is stored. Further, these programs often make use of pointer-based dynamic data structures. Effective exploitation of instruction-level parallelism (ILP) in such programs is significantly aided by the ability of a compiler to accurately disambiguate pointer-based memory references.

Disambiguation of pointer-based references typically requires pointer analysis. However, even an expensive, sophisticated pointer analysis cannot disambiguate all pointer references, especially references to dynamically allocated structures. Because the majority of pointer references in many programs are field accesses to such dynamically allocated structures, a need exists to accurately and efficiently disambiguate these references.

DETAILED DESCRIPTION

In general, computer programmers write computer code as a source program in a high-level computer programming language and compile this high level code into executable code for execution on a data processing system. The type of computer programming languages used to write the computer code may vary from procedural code type languages to object oriented languages. Object oriented languages include, for example, C++. As discussed above, certain programming languages, such as C++, make extensive use of pointers and pointer-based dynamic data structures.

Embodiments of the present invention may be used to provide effective disambiguation of memory references, such as pointer-based structure field accesses. Certain embodiments may be particularly suited to programs written in C and C++; however, it is to be understood that other embodiments are equally applicable to other programming languages which support pointer variables.

The logic to perform disambiguation in one embodiment may be implemented in a compiler, which translates a program written in a high-level programming language into machine language. Alternately, disambiguation of memory references in accordance with another embodiment may be implemented by other programs that analyze the control and data flow of programs, such as software understanding or testing tools. Further still, embodiments may be implemented in other software development tools.

Currently, compilers are not able to accurately disambiguate field accesses to dynamically allocated structures. One technique to disambiguate these references is pointer analysis. However, pointer analysis typically cannot resolve references to structures allocated at the same static allocation site in the program. Embodiments of the present invention do not have this limitation, as reliance is placed on a more general attribute of pointer variables and not on an estimation of their specific targets, as is done in a pointer analysis.

In one example embodiment, pure pointers within a source program may be identified in an analysis engine of a compiler. The identified pure pointers may then be processed by a disambiguation engine of a compiler to determine whether given field accesses overlap. Embodiments of the present invention may be efficient in analysis time and effective for the common case of memory disambiguation. As such, use in a compiler or other analysis tool can improve accuracy of disambiguation and runtime performance, thus extracting maximum performance out of a target microprocessor.

Figure 1:
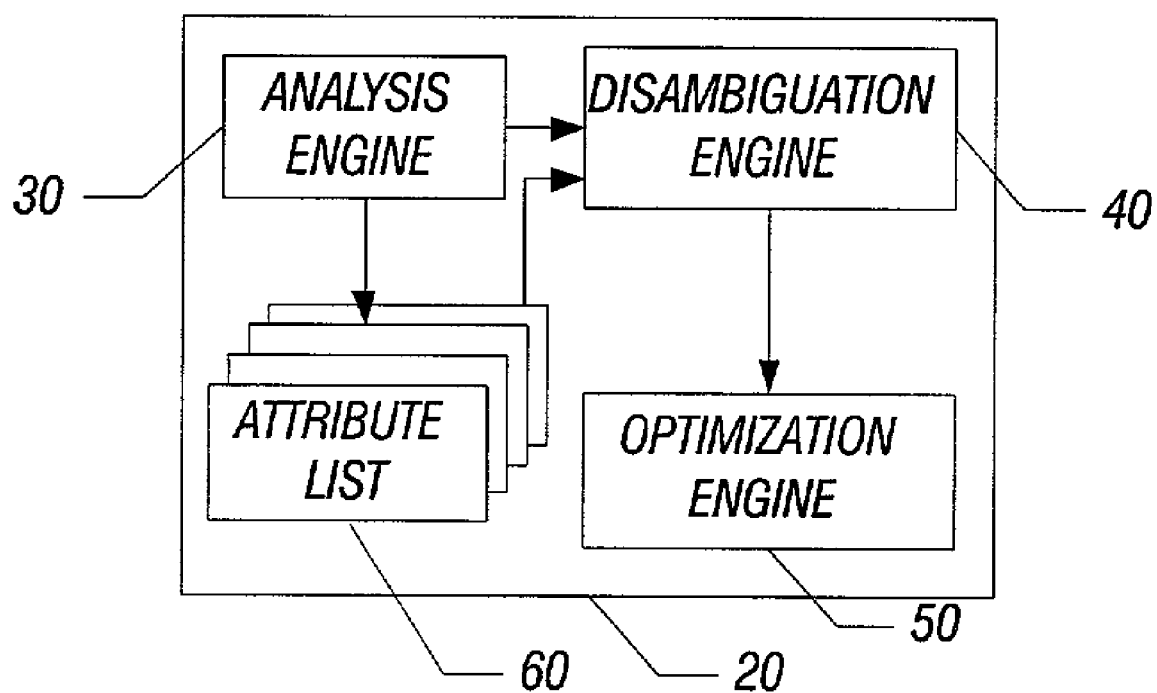
FIG. 1 is a block diagram of a program compiler according to one embodiment of the present invention.

Pure pointer identification and its use to disambiguate memory references may be used for any suitable programming tool or analyzer, such as a compiler or interpreter. FIG. 1 is a block diagram of one embodiment of a program compiler 20 that may be used to disambiguate memory references, such as structure field accesses. Compiler 20 compiles source code of a source program written in a source language into target code of a desired target language. The target code may be executed directly by a data processing system or linked with other target code for execution by the data processing system. Compiler 20 may include an analysis engine 30, a disambiguation engine 40 and an optimization engine 50. Further, compiler 20 may include an attribute list 60 for each variable of the source program, which may be used to set forth particular attributes of the respective variables. While it is to be understood that compiler 20 may include additional components and features well known to those of skill in the art, only the above components are relevant to the discussion herein.

Figure 2:
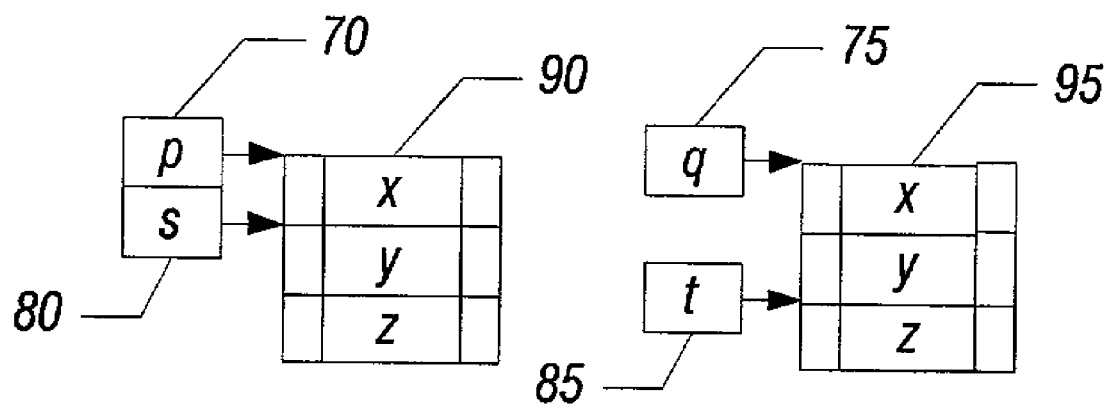
FIG. 2 is a block diagram of example pointer references to memory locations.

As discussed above, a pointer is a variable containing the address of another object. A pointer is a pure pointer if it either points to a scalar variable or if it points at offset zero of a composite object, such as a structure or an array. A pointer pointing into the middle of an array or a structure is a non-pure pointer. For example, as shown in FIG. 2, pointers p (reference 70) and q (reference 75) are pure pointers as they point at offset zero of structures 90 and 95, respectively, while pointers s (reference 80) and t (reference 85) are non-pure pointers.

In a C or C++ program, a pointer can be made to point into the middle of a composite object either by: (i) the application of pointer arithmetic, possibly along with type-casting; or (ii) taking the address of a structure field or an array element. Type-casting is an operation in which an expression is converted to a desired target type. The following example source code statements, written in C++, may be used to illustrate various properties of pointers:

S: p=(foo*)malloc(sizeof(foo));
T: q=(foo*)malloc(sizeof(foo));
U: s=(char*)p;
V: t=(char*)q;
W: s=s+4;
X: t=t+8.

In the above example code statements, the structure pointer p is type-cast as pointer to char s at statement U. On application of pointer arithmetic on s at statement W, it points at offset 4 of the structure pointed by p, and becomes a non-pure pointer.

Figure 3:
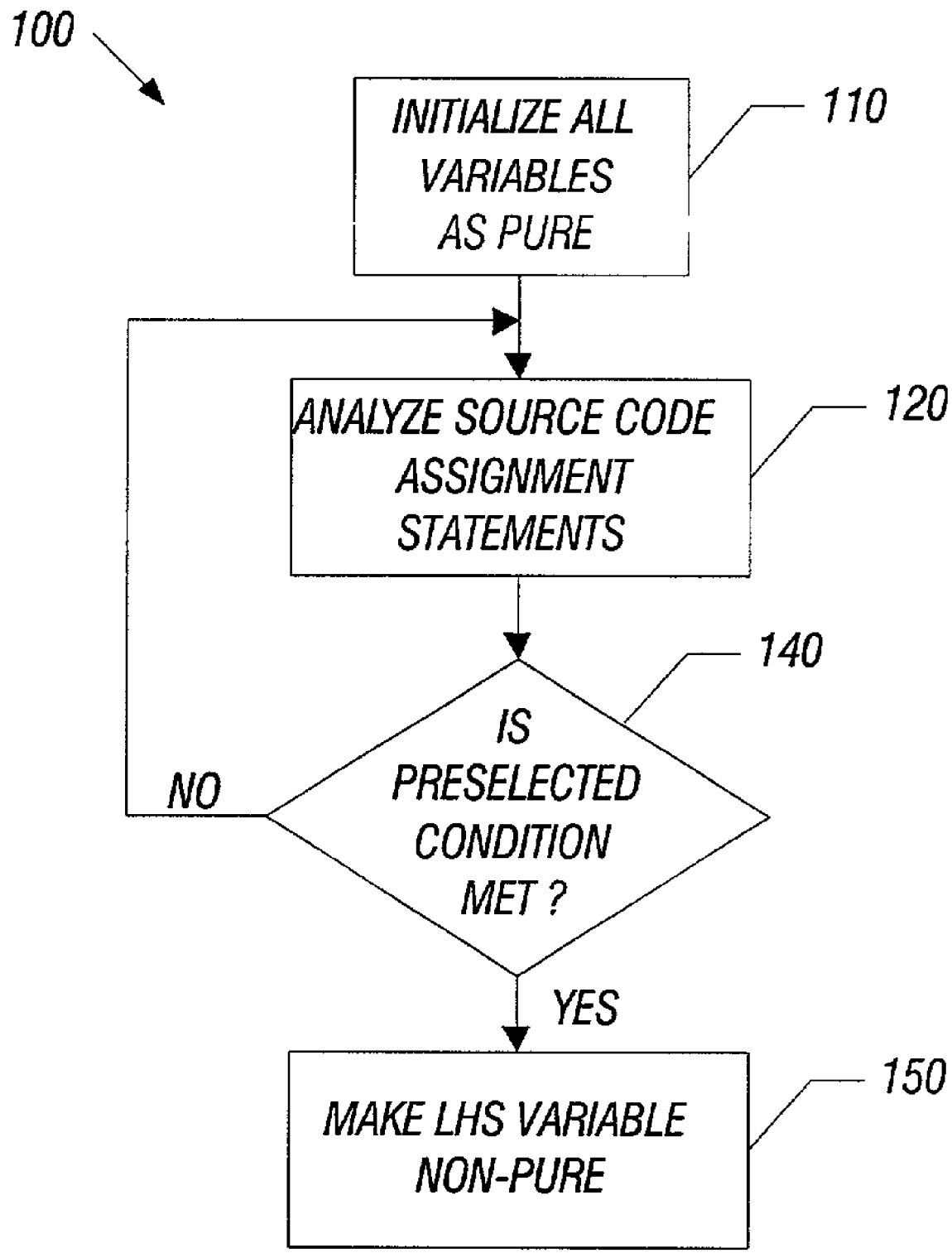
FIG. 3 is a flow chart of an example module for identification of pure pointer variables according to one embodiment of the present invention.

In one embodiment of the present invention, accurate disambiguation may be accomplished by identifying all pure pointers in a source program. Such identification of pure pointers may be performed in accordance with the flow chart set forth as FIG. 3, which is a flow diagram of an example module for such identification according to one embodiment of the present invention. As shown in FIG. 3, module 100 begins with the initialization of all variables as pure variables (block 110). Although it is to be understood that the module is most applicable to pointers, it is not necessary for initialization to be limited to pointers, nor is it necessary to identify pointers separately from other variables. Thus, while it is to be understood that the focus of identification is on pointers, the embodiment shown in FIG. 3 is applicable to all variables. Further, because of the ease with which pointers can be confused with other variables, it is preferable to initialize as pure all variables within a program. Initialization may be accomplished by initializing all variables in attribute lists 60 of compiler 20 as pure variables.

Next, each assignment statement (i.e., having the form "lhs=rhs") within the source program is analyzed (block 120). Specifically, the statement is examined to determine the presence of at least one of a preselected set of conditions (diamond 140). In one embodiment, the preselected conditions include the following: (a) whether the right-hand side ("rhs") involves an arithmetic operation; (b) whether the address of a field is taken on rhs; or (c) whether rhs contains a variable already identified as non-pure. If one or more of these conditions is met by the assignment statement, all variables represented by the left-hand side ("lhs") are designated non-pure (block 150). Such designation may be made in attribute lists 60 of compiler 20. If none of the preselected conditions is met for an assignment statement, block 120 is again invoked to analyze the next code statement.

While not shown in FIG. 3, module 100 continues iteratively through the source code statements until no further non-pure variables can be identified and designated.

In an example embodiment, pure pointer identification may be performed after a points-to analysis, so that the compiler already has identified any variables represented by indirect assignments, such as *p=*q. However, it is to be understood that pure pointer identification can also be performed in conjunction with points-to analysis, if required. Because the pure pointer identification module begins with the assumption that all pointers are pure, it is desirable that the entire source program be analyzed, so that all non-pure pointers may be detected.

Figure 4:
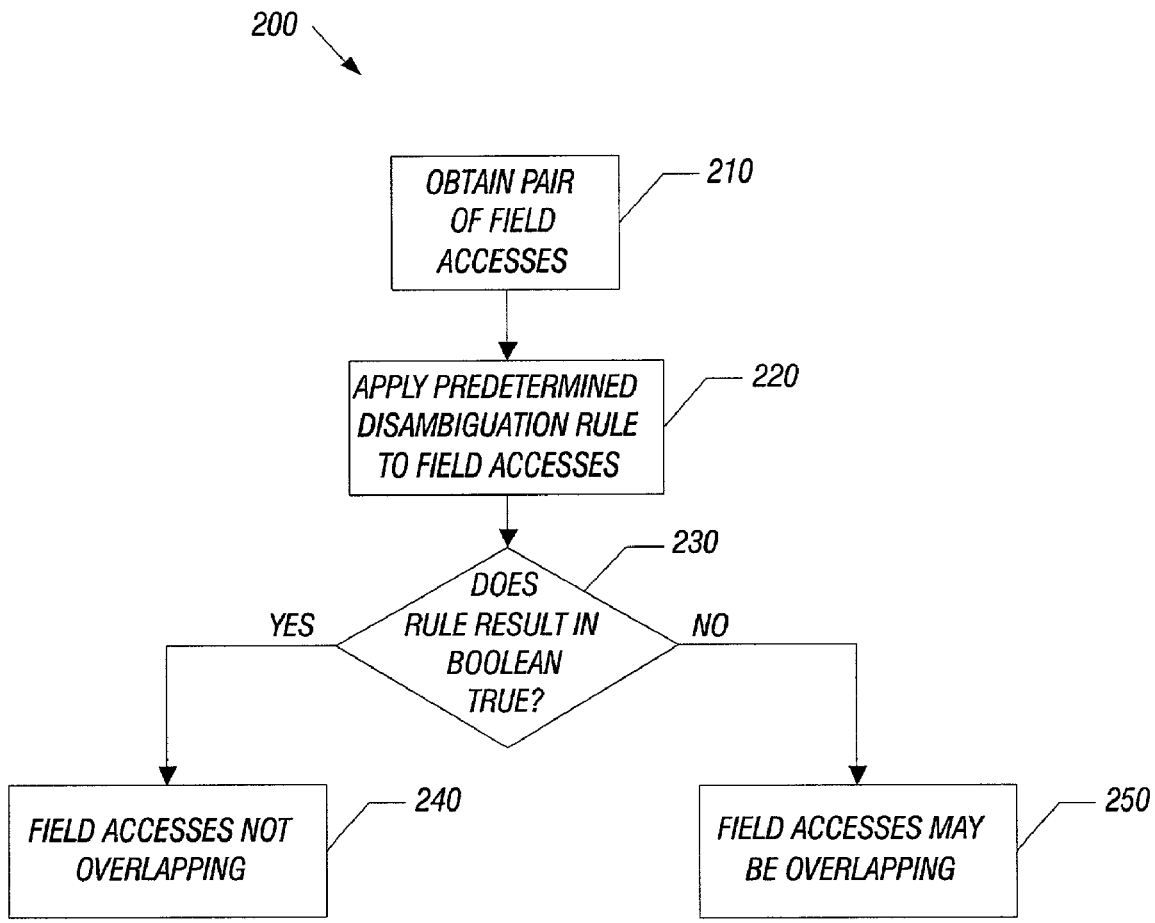
FIG. 4 is a flow chart of an example module for disambiguation of memory references according to one embodiment of the present invention.

After identification, the pure pointers in a source program may be used by disambiguation engine 40 of compiler 20 to accurately disambiguate structure field accesses. FIG. 4 is a flow chart of an example module 200 for disambiguation of memory references according to one embodiment of the present invention. As shown in FIG. 4, a pair of field accesses may be obtained by disambiguation engine 40 (block 210). For example, the pair of field accesses may be the pointer-based structure field accesses "p->x" and "q->y". At block 220, a predetermined disambiguation rule may be applied to the pair of field accesses. In an example embodiment, the disambiguation rule may be a pair of inequalities. In such an example embodiment, the first inequality may be "offsetof(x)+sizeof(x)<offsetof(y)." The second inequality of the example embodiment may be "offsetof(y)+sizeof(y)<offsetof(x)."

Next, the result of the rule may be analyzed for whether it returns a true or false result (diamond 230). In the embodiment shown in FIG. 4, if the result is true disambiguation engine 40 indicates that the pair of memory references does not overlap (block 240). If the result is false, disambiguation engine 40 indicates that the pair of memory references may overlap (block 250). However, it is to be understood that in other embodiments, a false (or non-Boolean) result may indicate non-overlapping or disjoint objects.

For the specific embodiment of the disambiguation rule described above, if the result of either of the inequalities is true, then "p->x" and "q->y" access non-overlapping memory locations. That is, given two pointer-based structure field accesses "p->x" and "q->y," if both p and q are pure pointers, the disambiguation rule set forth above will be true. This occurs because if p and q point to disjoint objects, p->x and q->y are also disjoint. If p and q point to the same object, because they are pure pointers, they should both point at offset zero of the object. In this case, the inequalities stated above ensure that the two field accesses are non-overlapping.

Embodiments may be implemented in a compiler program or software understanding tools, among others. As such, these embodiments may be stored on a storage medium having stored thereon instructions which can be used to program a computer system to perform the embodiments. The storage medium may include, but is not limited to, any type of disk including floppy disks, optical disks, CD-ROMs, CD-RWs, and magneto-optical disks, semiconductor devices such as ROMs, RAMs, EPROMs, EEPROMs, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 5:
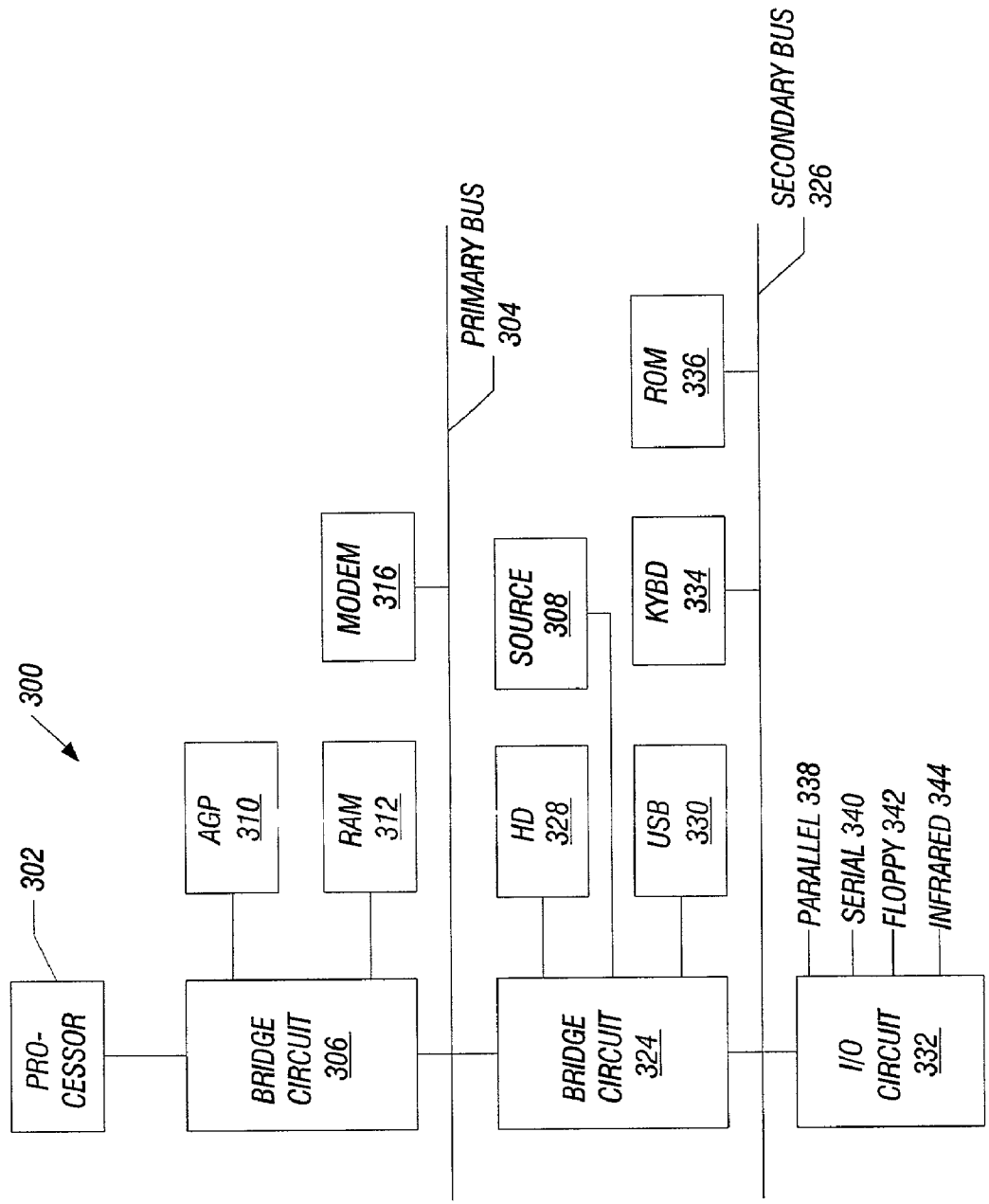
FIG. 5 is a block diagram of an example system according to one embodiment of the present invention.

Example embodiments may be implemented in software for execution by a suitable data processing system configured with a suitable combination of hardware devices. FIG. 5 is a block diagram of a representative data processing system, namely computer system 300 with which embodiments of the invention may be used.

Referring to FIG. 5, computer system 300 may include host processor 302 coupled to primary bus 304 through bridge circuit 306. Bridge circuit 306 may provide an accelerated graphics port (AGP) 310. Bridge circuit 306 may also provide an interface to couple system random access memory (RAM) 312 to primary bus 304. Illustrative host processor(s) 302 include the PENTIUM processor family of processors and the 80x86 families of processors from Intel Corporation. One illustrative bridge circuit 306 is the 82443LX PCI-to-AGP controller manufactured by Intel Corporation. An illustrative primary bus may conform to the peripheral component interface (PCI) standard. A modem 316 may be coupled to primary bus 304.

Bridge circuit 324 may couple system bus 304 to secondary bus 326, while also providing an interface with which hard disk drive 328 and multimedia source 308 may be coupled to computer system 300. Bridge circuit 324 may also provide universal serial bus (USB) interface 330. Source 308 may be, for example, a CD-ROM, CD-RW, or a DVD. One illustrative bridge circuit 324 is the 82371AB PCI-to-ISA/IDE controller made by Intel Corporation. Illustrative secondary buses 326 may conform to the PCI, industry standard interface (ISA), and extended industry standard interface (EISA) standards. Input-output (I/O) circuit 332, keyboard controller (KYBD) 334, and system read only memory (ROM) 336 may also be coupled to secondary bus 326. Input-output circuit 332 may provide an interface for parallel 338 and serial 340 port devices, floppy disks 342, and infrared devices 344.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
    initializing a plurality of pointers of a computer program as pure pointers;
    analyzing an assignment statement of said computer program relating to one of said initialized pure pointers for compliance with at least one preselected condition; and
    converting said one pointer from a pure pointer to a non-pure pointer if said at least one preselected condition is met.

2. The method of claim 1, further comprising performing said analyzing and said converting until no further non-pure pointers exist in said computer program.

3. The method of claim 1, wherein said analyzing further comprises determining whether a right hand side of said assignment statement involves an arithmetic operation.

4. The method of claim 1, wherein said analyzing further comprises determining whether an address of a field is taken on a right hand side of said assignment statement.

5. The method of claim 1, wherein said analyzing further comprises determining whether a right hand side of said assignment statement contains a non-pure pointer.

6. A computer-implemented method comprising:
    initializing a plurality of pointers of a computer program as pure pointers;
    analyzing said computer program for an assignment statement;
    resetting a pointer associated with said assignment statement from a pure pointer to a non-pure pointer if a predetermined condition is met;
    iteratively performing said analyzing and said resetting until no further non-pure pointers can be reset in said computer program; and
    disambiguating a remaining group of said pure pointers.

7. The method of claim 6, wherein said predetermined condition comprises at least one of:
    when a right hand side of said assignment statement involves an arithmetic operation;
    when an address of a field is taken on a right hand side of said assignment statement; and
    when a right hand side of said assignment statement contains a non-pure pointer.

8. The method of claim 6, wherein said disambiguating comprises applying a preselected disambiguation rule to pairs of memory references associated with said remaining group of said pure pointers.

9. An article comprising a machine-readable storage medium containing instructions that if executed enables a system to:
    initialize a plurality of pointers of a computer program as pure pointers;
    analyze said computer program for an assignment statement;
    reset a pointer associated with said assignment statement from a pure pointer to a non-pure pointer if a predetermined condition is met;
    iteratively perform said analyzing and said resetting until no further non-pure pointers can be reset in said computer program; and
    disambiguate a remaining group of said pure pointers.

10. The article of claim 9, wherein said disambiguate comprises applying a preselected disambiguation rule to pairs of memory references associated with said remaining group of said pure pointers.

11. The article of claim 9, wherein said predetermined condition comprises at least one of:
    when a right hand side of said assignment statement involves an arithmetic operation;
    when an address of a field is taken on a right hand side of said assignment statement; and
    when a right hand side of said assignment statement contains a non-pure pointer.

12. An article comprising a machine-readable storage medium containing instructions that if executed enables a system to:
    initialize all of a plurality of pointers of a computer program as pure pointers;
    analyze an assignment statement of said computer program relating to one of said initialized pure pointers for compliance with at least one preselected condition; and
    convert said one pointer from a pure pointer to a non-pure pointer if said at least one preselected condition is met.

13. The article of claim 12, further comprising instructions that if executed enable said system to said analyze and said convert until no further non-pure pointers exist in said computer program.

14. The article of claim 12, wherein the computer program includes a plurality of variables, further comprising instructions that if executed enable said system to initialize each of the plurality of variables within the computer program as a pure variable via initialization of the plurality of variables within a plurality of attribute lists of a compiler.

* * * * *